(12) United States Patent
Conover

(10) Patent No.: US 9,932,076 B2
(45) Date of Patent: Apr. 3, 2018

(54) TRACK CLEANING SYSTEM

(71) Applicant: Kim Conover, Waldron, IN (US)

(72) Inventor: Kim Conover, Waldron, IN (US)

(*) Notice: Subject to any disclaimer, the term of this patent is extended or adjusted under 35 U.S.C. 154(b) by 34 days.

(21) Appl. No.: 14/933,151

(22) Filed: Nov. 5, 2015

(65) Prior Publication Data
US 2017/0129554 A1 May 11, 2017

(51) Int. Cl.
*B62D 55/088* (2006.01)

(52) U.S. Cl.
CPC ....... *B62D 55/0882* (2013.01); *B62D 55/088* (2013.01)

(58) Field of Classification Search
CPC .... B62D 55/088; B62D 55/082; B62D 55/06; B62D 55/0882; B60S 1/66; B60S 1/603
USPC .......................... 305/100, 107, 110, 111, 112
See application file for complete search history.

(56) References Cited

U.S. PATENT DOCUMENTS

| | | | | |
|---|---|---|---|---|
| 1,992,702 A * | 2/1935 | Koop | ................. | B62D 55/0845 305/109 |
| 2,135,119 A | 11/1938 | Wood | | |
| 2,146,882 A * | 2/1939 | Baker | ................. | B62D 55/0845 305/109 |
| 2,560,307 A * | 7/1951 | Slemmons | ......... | B62D 55/0882 305/110 |
| 2,885,069 A * | 5/1959 | Bowen | ................. | B65G 45/105 15/256.5 |
| 4,280,616 A * | 7/1981 | Wadensten | ........... | B65G 45/105 198/494 |
| 4,407,403 A * | 10/1983 | Wadensten | ........... | B65G 45/105 198/494 |
| 4,531,787 A * | 7/1985 | Hart | ....................... | B62D 55/08 280/855 |
| 4,553,790 A * | 11/1985 | Boggs | .................... | B62D 55/08 305/132 |
| 4,768,256 A | 9/1988 | Motoda | | |
| 5,136,425 A | 8/1992 | Fujie et al. | | |
| 5,170,288 A | 12/1992 | Imaizumi et al. | | |
| 7,084,553 B2 | 8/2006 | Ludwiczak | | |
| 8,020,948 B2* | 9/2011 | Inaoka | ................. | B62D 55/088 180/9.1 |
| 8,517,313 B2 | 8/2013 | Gornik | | |
| 8,845,039 B2* | 9/2014 | Nebergall | .......... | B62D 55/0882 305/100 |
| D719,588 S | 12/2014 | Meyer et al. | | |
| 2011/0108332 A1* | 5/2011 | Gleasman | ............ | B62D 55/125 180/6.7 |
| 2012/0253612 A1 | 10/2012 | Byrne | | |
| 2015/0211207 A1* | 7/2015 | Yamamoto | .............. | E02F 9/024 180/9.23 |

* cited by examiner

*Primary Examiner* — Kip T Kotter
*Assistant Examiner* — Scott A Browne

(57) ABSTRACT

A track cleaning system includes a vehicle that has at least one track. A collection unit is coupled to the at least one track. The collection unit collects debris that collects on the at least one track. The collection unit is electrically coupled to the vehicle. The collection unit is actuated to vibrate. Thus, the collection unit may dislodge the debris from the at least one track thereby inhibiting the debris from impeding performance of the at least one track.

6 Claims, 4 Drawing Sheets

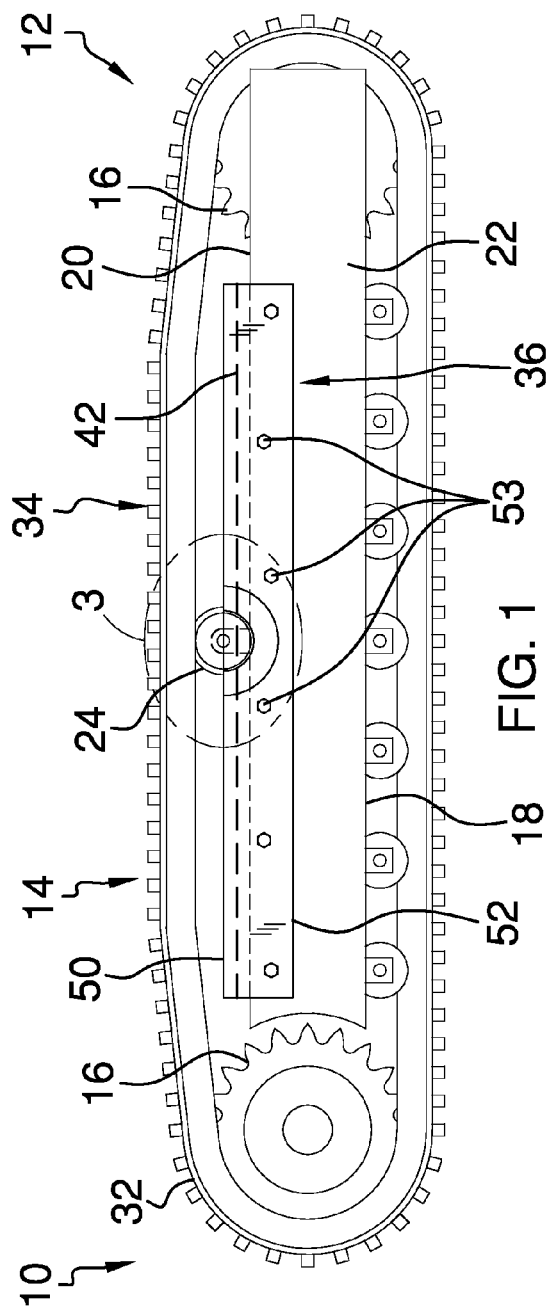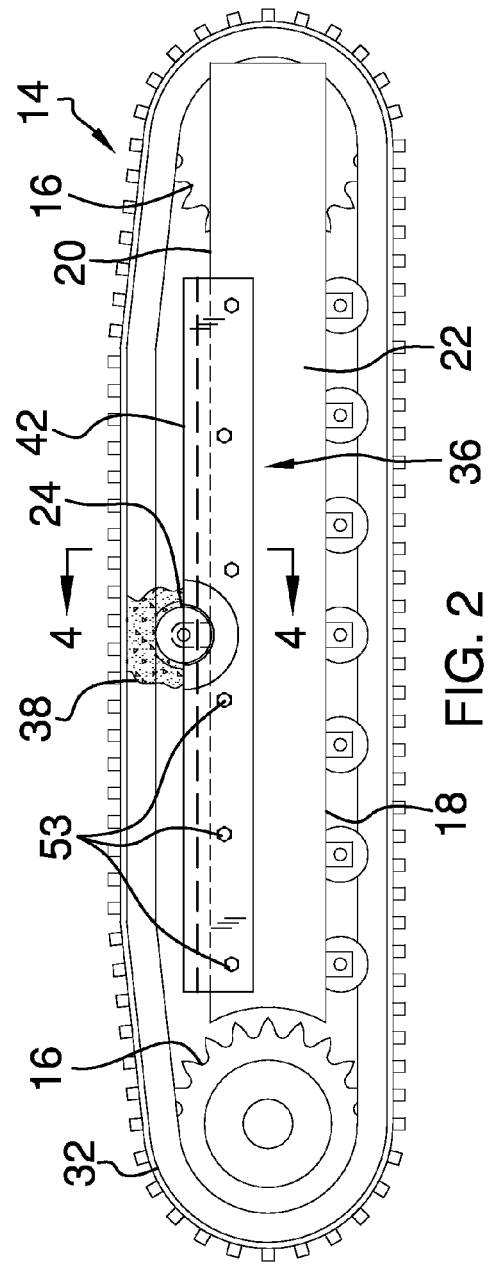

TRACK CLEANING SYSTEM

BACKGROUND OF THE DISCLOSURE

Field of the Disclosure

The disclosure relates to cleaning devices and more particularly pertains to a new cleaning device for removing debris that collects in a track of a vehicle.

SUMMARY OF THE DISCLOSURE

An embodiment of the disclosure meets the needs presented above by generally comprising a vehicle that has at least one track. A collection unit is coupled to the at least one track. The collection unit collects debris that collects on the at least one track. The collection unit is electrically coupled to the vehicle. The collection unit is actuated to vibrate. Thus, the collection unit may dislodge the debris from the at least one track thereby inhibiting the debris from impeding performance of the at least one track.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a side perspective view of a track cleaning system according to an embodiment of the disclosure.

FIG. 2 is a perspective view of an embodiment of the disclosure.

DESCRIPTION OF THE PREFERRED EMBODIMENT

Figure 3:
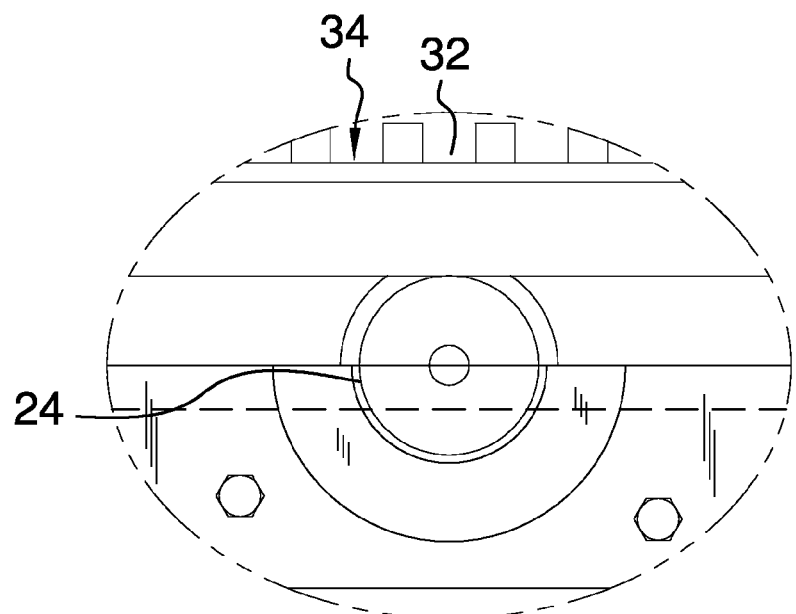
FIG. 3 is a detail view taken from circle 3 of FIG. 1 of an embodiment of the disclosure.
Figure 4:
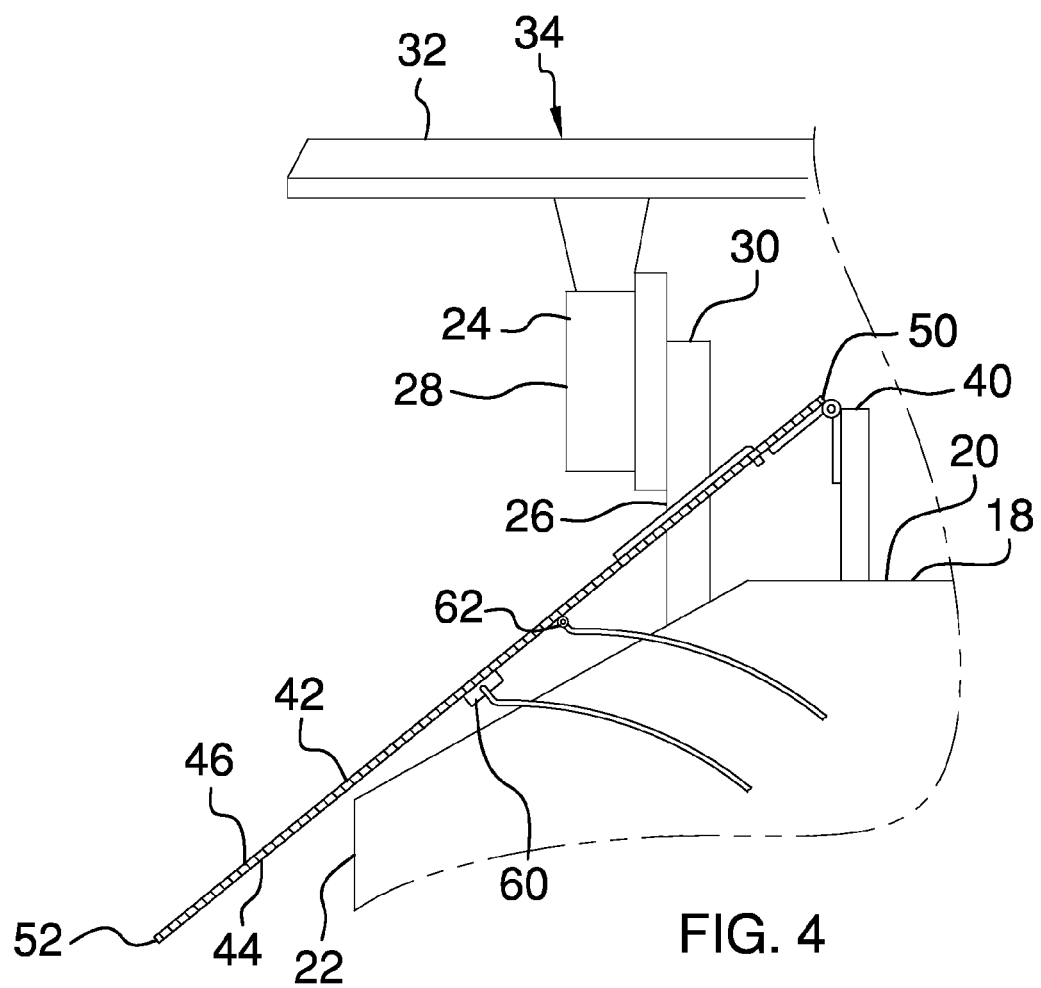
FIG. 4 is a cross sectional view taken along line 4-4 of FIG. 2 of an embodiment of the disclosure.
Figure 5:
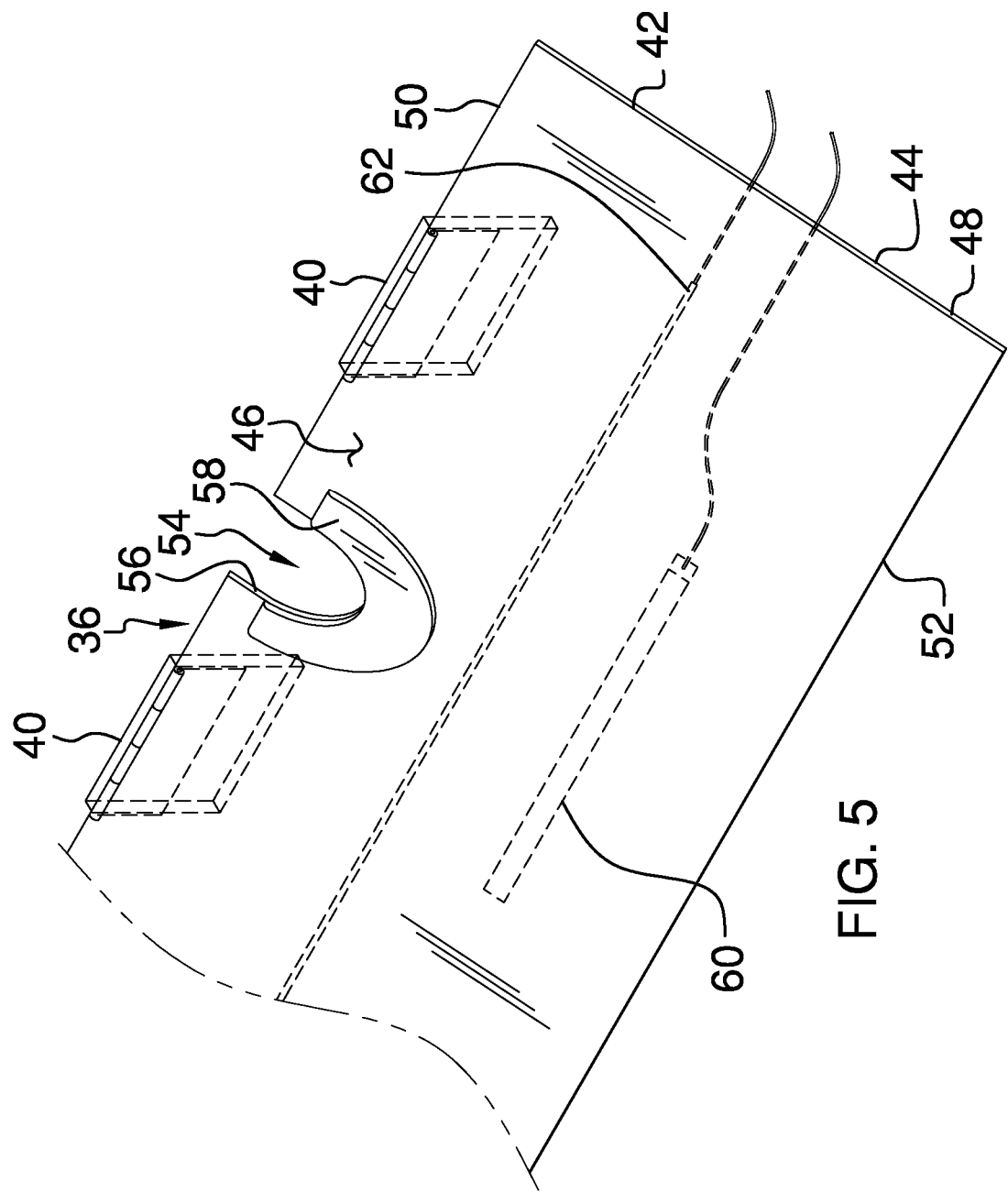
FIG. 5 is a top perspective view of a collection unit of an embodiment of the disclosure.
Figure 6:
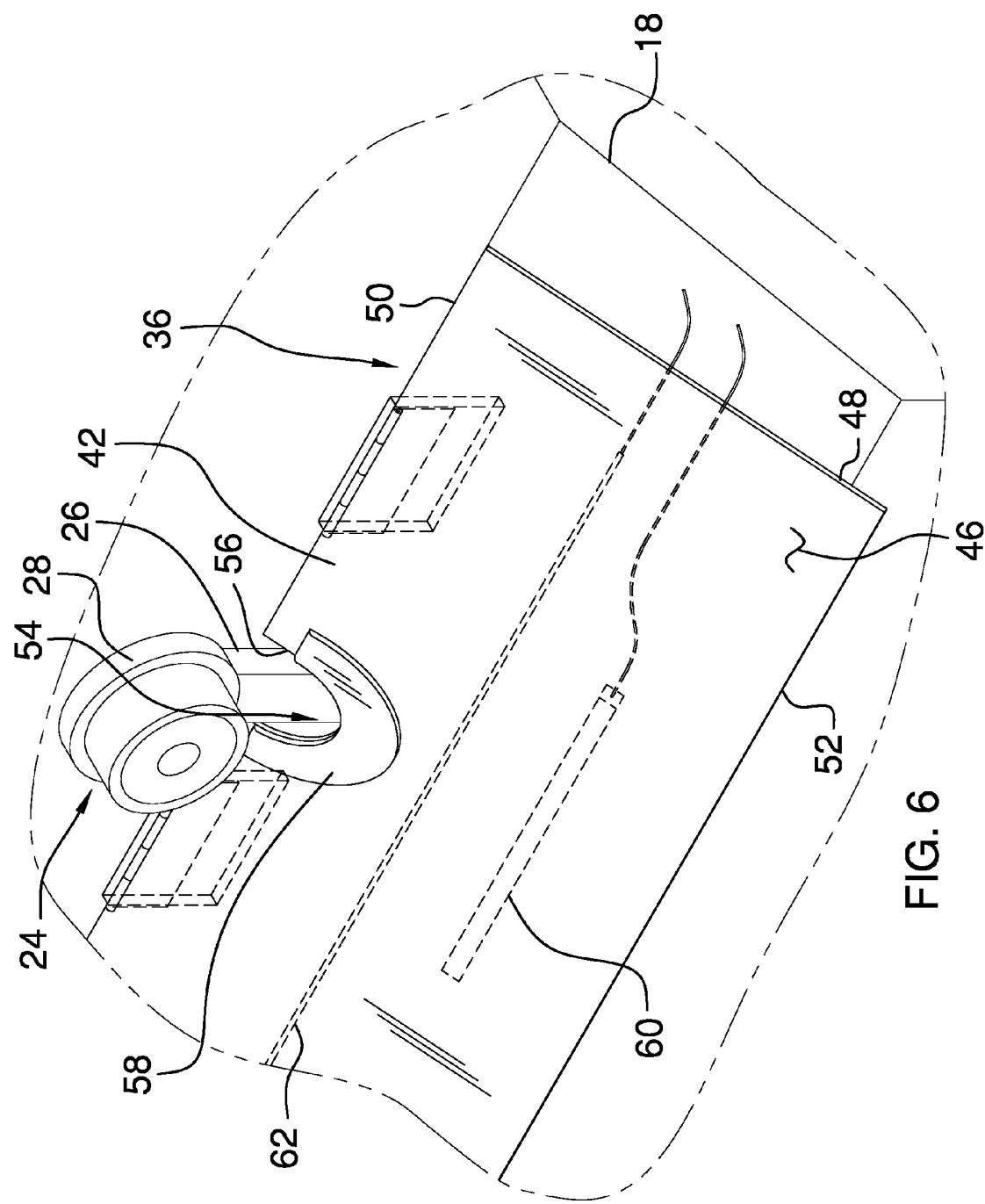
FIG. 6 is a perspective view of collection unit of an embodiment of the disclosure.

With reference now to the drawings, and in particular to FIGS. 1 through 6 thereof, a new cleaning device embodying the principles and concepts of an embodiment of the disclosure and generally designated by the reference numeral 10 will be described.

As best illustrated in FIGS. 1 through 6, the track cleaning system 10 generally comprises a vehicle 12 that has at least one track 14. The vehicle 12 may comprise a bulldozer, an excavator or other vehicle utilizing at least one track to move along Earth. The at least one track 14 comprises a pair of sprockets 16. Each of the sprockets 16 is rotatably coupled to the vehicle 12 and the sprockets 16 are spaced apart from each other. The at least one track 14 further includes a center frame 18 extending between the sprockets 16. The center frame 18 has a top side 20 and an outwardly facing side 22.

A top roller 24 is coupled to and extends upwardly from the center frame 18. The top roller 24 includes a tower 26 and a wheel 28. The tower 26 is coupled to the top side 20 of the center frame 18 and the tower 26 has a distal end 30 with respect to the top side 20. The wheel 28 is rotatably coupled to the distal end 30.

A belt 32 extends around each of the sprockets 16 and the top roller 24. The belt 32 has a top portion 34. The top roller 24 rollably engages the top portion 34. Thus, the top portion 34 is spaced from the top side 20 of the center frame 18.

A collection unit 36 is coupled to the at least one track 14 and the collection unit 36 collects debris 38 that collects on the at least one track 14. The collection unit 36 is electrically coupled to the vehicle 12 and the collection unit 36 may be actuated to vibrate. Thus, the collection unit 36 may dislodge the debris 38 from the at least one track 14. The debris 38 is inhibited from impeding performance of the at least one track 14 and the debris 38 may comprise mud, dirt and rocks or the like.

The collection unit 36 comprises a pair of mounts 40 and each of the mounts 40 is coupled to the top side 20 of the center frame 18. Each of the mounts 40 is positioned between an associated one of the sprockets 16 and the top roller 24. A plate 42 is provided and the plate 42 has a bottom surface 44, a top surface 46 and a peripheral edge 48 extending between the top surface 46 and the bottom surface 44. The peripheral edge 48 has a first side 50 and a second side 52. The first side 50 is hingedly coupled to each of the mounts 40 such that the second side 52 is directed toward the outwardly facing side 22 of the center frame 18.

The plate 42 extends outwardly from the mounts 40 and the plate 42 extends substantially between the pair of sprockets 16. The plate 42 is positioned between the top portion 34 of belt 32 and the top side 20 of center frame 18. Thus, the debris 38 collects on the top surface 46 thereby inhibiting the debris 38 from collecting on the center frame 18. The plate 42 is oriented at a downward angle with respect to Earth. Thus, the plate 42 may direct the debris 38 outwardly from the at least one track 14.

A plurality of fasteners 53 is provided. The fasteners 53 extend through the plate 42 and engage the center frame 18. The fasteners 53 are spaced apart from each other and distributed along the plate 42. The fasteners 53 may comprise a bolt or the like. The fasteners 53 are loosely coupled to the center frame 18. Thus, the plate 42 is movable with respect to the center frame 18.

The first side 50 has a slot 54 extending toward the second side 52. The slot 54 is centrally positioned on the first side 50 such that the tower 26 is positioned in the slot 54. The slot 54 has a bounding edge 56. A flap 58 is coupled to the plate 42 and the flap 58 is coextensive with the bounding edge 56 of the slot 54. The flap 58 inhibits the debris 38 from passing between the tower 26 and the bounding edge 56. The flap 58 may be comprised of a resiliently compressible material such as rubber.

The top roller 24 may be one of a plurality of top rollers 24. The top rollers 24 may be spaced apart from each other and distributed along the center frame 18. The slot 54 may be one of a plurality of slots 54. Each of the plurality of slots 54 may be aligned with an associated one of the top rollers 24.

A vibration unit 60 is coupled to the bottom surface 44 and the vibration unit 60 is electrically coupled to the vehicle 12. The vibration unit 60 vibrates the plate 42 when the vibration unit 60 is turned on. Thus, the vibration unit 60 vibrationally urges the debris 38 toward the second side 52 of the plate 42. The vibration unit 60 may comprise an electrical vibration unit or the like that mechanically engages the bottom surface 44 of the plate 42. The vibration unit 60 may vibrate the plate 42 through any conventional mechanical means.

A heating unit 62 is coupled to the bottom surface 44 and the heating unit 62 is in thermal communication with the plate 42. The heating unit 62 is electrically coupled to the vehicle 12. The heating unit 62 may comprise an electrical heating coil or the like. The heating unit 62 heats the plate 42 when the heating unit 62 is turned on. Thus, the heating unit 62 may melt frozen debris 38 on the plate 42 thereby facilitating the frozen debris 38 to be vibrationally urged toward the second side 52 of the plate 42.

In use, the vibration unit 60 is selectively turned on when the vehicle 12 is being operated. The vibration unit 60 vibrationally urges the debris 38 outwardly from the at least one track 14. The vibration unit 60 is turned on and off at any selected time. The heating unit 62 is selectively turned on when the vehicle 12 is operated in an environment involving freezing temperatures. The heating unit 62 melts frozen debris 38 on the plate 42. Thus, the vibration unit 62 may vibrationally urge the debris 38 outwardly from the at least one track 14. The collection unit 36 facilitates the at least one track 14 to function without being impeded by the debris 38.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A track cleaning system comprising:
    a vehicle having at least one track; and
    a collection unit being coupled to said at least one track wherein said collection unit is configured to collect debris that collects on said at least one track, said collection unit being electrically coupled to said vehicle, said collection unit being actuated to vibrate wherein said collection unit is configured to dislodge the debris from said at least one track thereby inhibiting the debris from impeding performance of said at least one track;
    said at least one track including a center frame, a pair of sprockets and a top roller, said center frame having a top side, said top roller including a tower;
    said collection unit comprising a pair of mounts, each of said mounts being coupled to said top side of said center frame, each of said mounts being positioned between an associated one of said sprockets and said top roller;
    a plate having a bottom surface, a top surface and a peripheral edge extending between said top surface and said bottom surface, said peripheral edge having a first side and a second side, said first side being hingedly coupled to each of said mounts such that said second side is directed outwardly from said at least one track, said plate extending outwardly from said mounts, said first side has a slot extending toward said second side, said slot being centrally positioned on said first side such that said tower is positioned in said slot, said slot having a boundary edge; and
    a flap being coupled to said plate, said flap being coextensive with said boundary edge of said slot wherein said flap is configured to inhibit the debris from passing between said tower and said boundary edge.

2. The system according to claim 1, wherein said at least one track comprises:
    each of said sprockets being rotatably coupled to said vehicle, said sprockets being spaced apart from each other;
    said center frame extending between said sprockets, said center frame having an outwardly facing side;
    said top roller being coupled to and extending upwardly from said center frame, said top roller including a wheel, said tower being coupled to said top side of said center frame, said tower having a distal end with respect to said top side, said wheel being rotatably coupled to said distal end; and
    a belt extending around each of said sprockets and said top roller, said belt having a top portion, said top roller rollably engaging said top portion such that top portion is spaced from said top side of said center frame.

3. The system according to claim 1, wherein:
    said at least one track includes a belt, said belt having a top portion; and
    said plate is positioned between said top portion of said belt and said top side of said center frame wherein said top surface is configured to collect the debris thereby inhibiting the debris from collecting on said center frame, said plate being oriented at a downward angle wherein said plate is configured to direct the debris outwardly from said at least one track.

4. The system according to claim 1, further comprising a vibration unit being coupled to said bottom surface, said vibration unit being electrically coupled to said vehicle, said vibration unit vibrating said plate when said vibration unit is turned on wherein said vibration unit is configured to vibrationally urge the debris toward said second side of said plate.

5. The system according to claim 4, further comprising a heating unit being coupled to said bottom surface such that said heating unit is in thermal communication with said plate, said heating unit being electrically coupled to said vehicle, said heating unit heating said plate when said heating unit is turned on wherein said heating unit is configured to melt frozen debris on said plate thereby facilitating the frozen debris to be vibrationally urged toward said second side of said plate.

6. A track cleaning system comprising:
    a vehicle having at least one track, said at least one track comprising:

a pair of sprockets, each of said sprockets being rotatably coupled to said vehicle, said sprockets being spaced apart from each other, a center frame extending between said sprockets, said center frame having a top side and an outwardly facing side, a top roller being coupled to and extending upwardly from said center frame, said top roller including a tower and a wheel, said tower being coupled to said top side of said center frame, said tower having a distal end with respect to said top side, said wheel being rotatably coupled to said distal end, and a belt extending around each of said sprockets and said top roller, said belt having a top portion, said top roller rollably engaging said top portion such that said top portion is spaced from said top side of said center frame; and a collection unit being coupled to said at least one track wherein said collection unit is configured to collect debris that collects on said at least one track, said collection unit being electrically coupled to said vehicle, said collection unit being actuated to vibrate wherein said collection unit is configured to dislodge the debris from said at least one track thereby inhibiting the debris from impeding performance of said at least one track, said collection unit comprising:

a pair of mounts, each of said mounts being coupled to said top side of said center frame, each of said mounts being positioned between an associated one of said sprockets and said top roller, a plate having a bottom surface, a top surface and a peripheral edge extending between said top surface and said bottom surface, said peripheral edge having a first side and a second side, said first side being hingedly coupled to each of said mounts such that said second side is directed outwardly from said at least one track, said plate extending outwardly from said mounts, said plate being positioned between said top portion of belt and said top side of center frame wherein said top surface is configured to collect the debris thereby inhibiting the debris from collecting on said center frame, said plate being oriented at a downward angle wherein said plate is configured to direct the debris outwardly from said at least one track, said first side having a slot extending toward said second side, said slot being centrally positioned on said first side such that said tower is positioned in said slot, said slot having a boundary edge, a flap being coupled to said plate, said flap being coextensive with said boundary edge of said slot wherein said flap is configured to inhibit the debris from passing between said tower and said boundary edge, a vibration unit being coupled to said bottom surface, said vibration unit being electrically coupled to said vehicle, said vibration unit vibrating said plate when said vibration unit is turned on wherein said vibration unit is configured to vibrationally urge the debris toward said second side of said plate, and a heating unit being coupled to said bottom surface such that said heating unit is in thermal communication with said plate, said heating unit being electrically coupled to said vehicle, said heating unit heating said plate when said heating unit is turned on wherein said heating unit is configured to melt frozen debris on said plate thereby facilitating the frozen debris to be vibrationally urged toward said second side of said plate.

\* \* \* \* \*